Nov. 18, 1930.   C. DUMLER   1,782,257
REVOLVING DISPLAY STAND
Filed Oct. 30, 1928   2 Sheets-Sheet 1
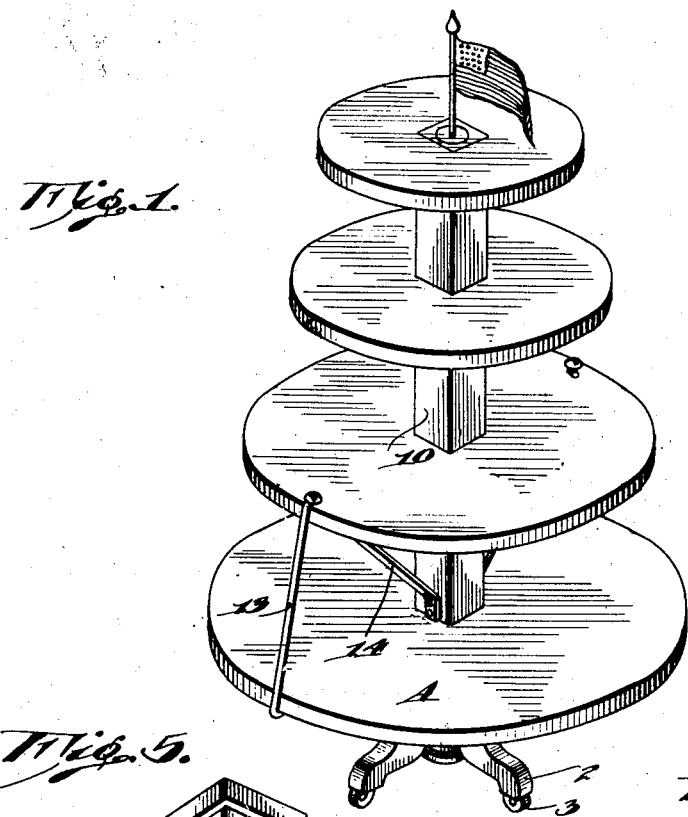
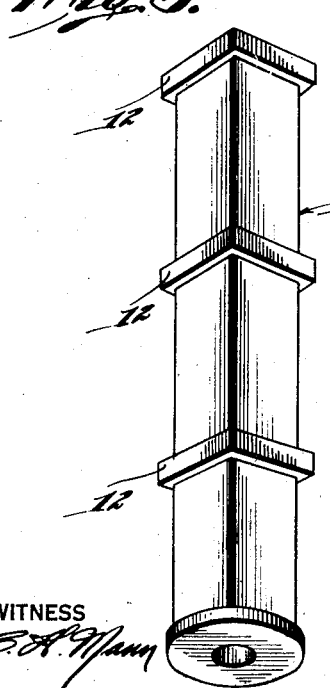
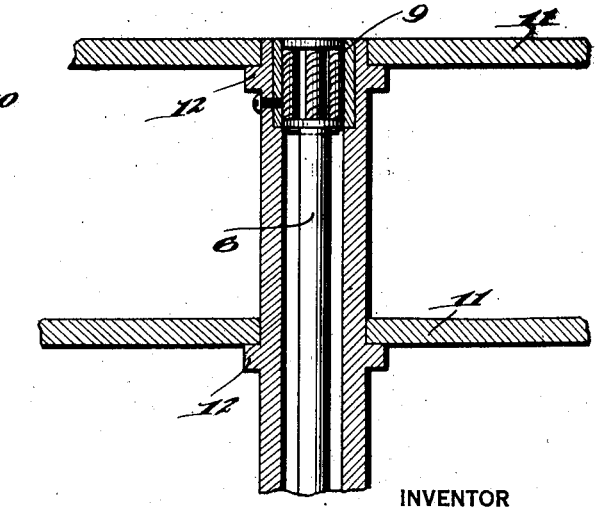
WITNESS
INVENTOR
Charles Dumler,
BY
ATTORNEY

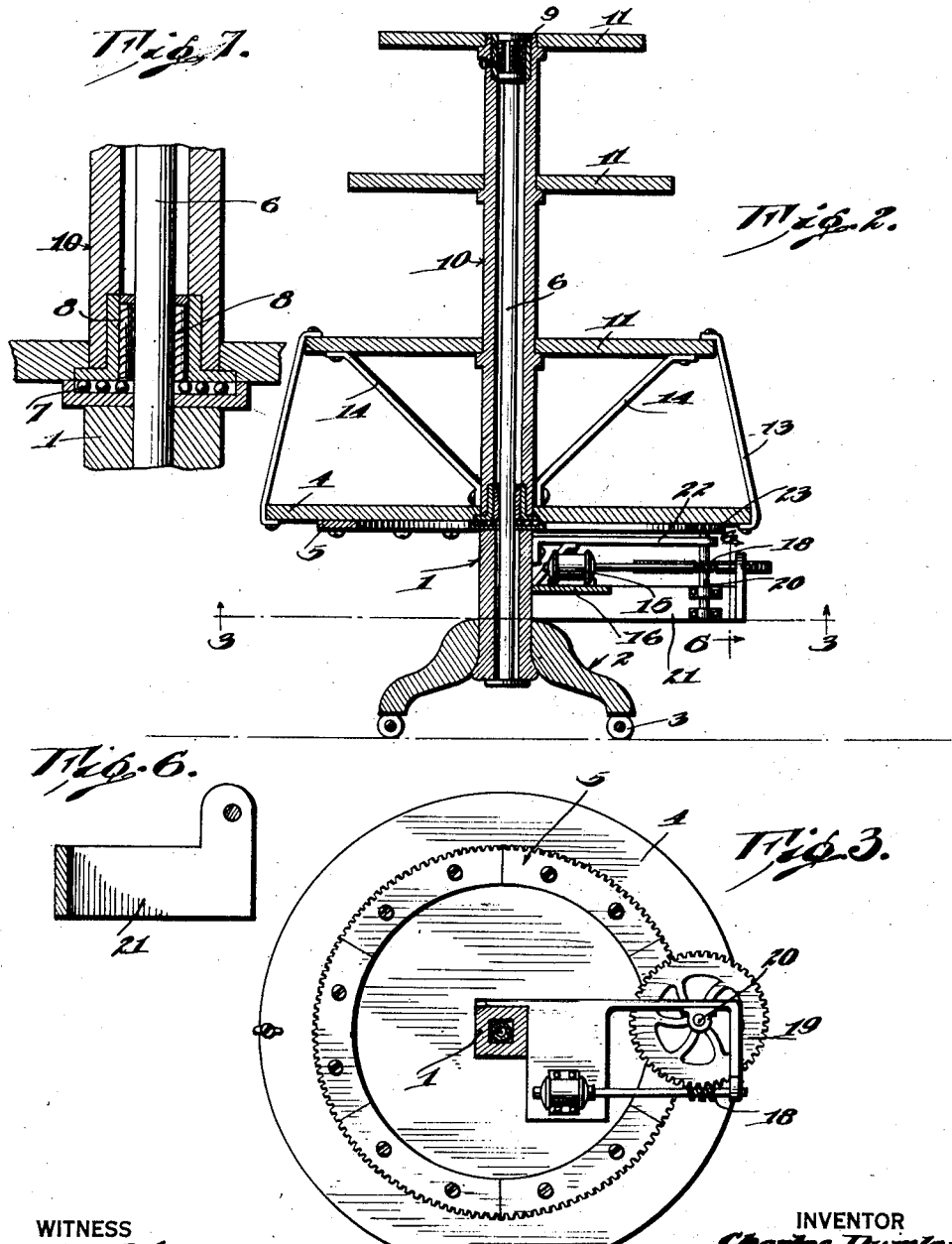

Patented Nov. 18, 1930

1,782,257

UNITED STATES PATENT OFFICE

CHARLES DUMLER, OF CANTON, OKLAHOMA

REVOLVING DISPLAY STAND

Application filed October 30, 1928. Serial No. 316,023.

This invention relates to revolving display stands.

A primary object of the invention is to provide a slowly revoluble member which is compact and simple in construction and operation and which is adaptable for various uses and while occupying a minimum floor space provides a maximum display surface.

Another object is to provide a stand of this character having a revoluble main member or base on which may be removably mounted display racks or members of different characters adapting the stand for use for a variety of different purposes.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a perspective view of a revolving stand constructed in accordance with this invention and equipped with a plurality of graduated shelves on which may be mounted articles of different kinds;

Fig. 2 is a vertical section thereof;

Fig. 3 is a horizontal section taken on the line 3—3 of Fig. 2;

Fig. 4 is an enlarged detail vertical section through the upper portion of the standard;

Fig. 5 is a perspective view of the removable shock supporting member or standard detached; and Fig. 6 is a detail section taken on the line 6—6 of Fig. 2.

Fig. 7 is an enlarged view showing the connection between the hollow post, spindle and pedestal.

In the embodiment illustrated a hollow pedestal 1 is shown having a supporting base 2 equipped with casters 3 to provide for the ready removal of the stand from place to place.

Fixedly mounted on the upper ends of the pedestal 1 is a table or platform 4 which may be of any desired configuration, here shown circular, and on the lower face of which is secured an annular gear 5. This gear, as shown, is constructed of a plurality of sections although obviously it can be made in one piece if it is desirable to do so. Mounted in this pedestal 1 and projected some distance above the top thereof is a spindle or shaft 6. A ball bearing 7 is carried by the upper end of the pedestal 1 and on which is designed to be rotatably mounted a hollow standard 10 between which and the spindle or shaft 6 is arranged a roller bearing 8, a similar bearing 9 being located at the upper end of the spindle 6 between it and the hollow standard or post 10 and which provides for the free rotation of said post on said spindle.

The table 4 has the central opening therein made with its lower portion round to fit on the roller bearing 8 and the upper portion thereof made angular to receive the hollow post 10 which is correspondingly shaped and seated in said opening so that when the table 4 rotates the post 10 will be carried with it. The post 10 is provided with a plurality of vertically spaced shelves or platforms 11, three being here shown and which are graduated in size from the lowermost to the uppermost. As shown these shelves are supported by collars 12 fixed to the post 10 in any suitable manner, being here shown made integral therewith, the lowermost shelf 11 of the post 10 is shown connected with the table 4 by detachable brace members 13 while other oblique braces 14 connect the lower face of the shelf 11 with the bottom of the post 10 as is shown clearly in Figs. 1 and 2.

Means for revolving the platform 4 and the post 10 connected therewith is shown in the form of a small electric motor 15 mounted on a shelf 16 carried by the pedestal 1. The driving shaft 17 of this motor is extended and provided with a worm 18 which meshes with a worm gear 19 mounted on an upright spindle 20 journaled in suitable bearings on supporting plates or brackets 21 and 22 carried by the pedestal 1. On the upper end of the spindle 20 is a cog wheel 23 positioned to mesh with the annular gear 5 on the lower face of the platform 4 and by means of which said platform is revolved.

It is of course understood that the cog wheel 23 may have any desired number of teeth according to the speed it is desired to impart to the stand.

It will be obvious that while the platform 4 is shown connected to operate the post 10 carrying the shelves 11 any other article supporting structure may be mounted on this platform and the platform may be either revolved automatically by the motor shown or it may be turned by hand according to the wishes of the owner. The post 10 may be removed and another post substituted carrying any desired display members.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. In a revolving display stand, a hollow pedestal, a platform mounted on the upper end of said pedestal and having an opening registering with the bore of the pedestal, a spindle mounted in said pedestal and projecting above it, a hollow post loosely mounted to rotate on said spindle and detachably engaged with said platform to rotate therewith, said post having a plurality of longitudinally spaced collars to receive and support a plurality of shelves.

2. In a revolving display stand, a hollow pedestal, a platform fixedly mounted on the upper end of said pedestal, and having an opening registering with the bore of the pedestal, a spindle mounted in said pedestal and projecting above it, a hollow post loosely mounted to turn on said spindle and detachably engaged with said platform to rotate therewith, said post having a plurality of longitudinally spaced collars to receive and support a plurality of shelves, and detachable brace members connecting two of said shelves adjacent their peripheries and brace members connected at one end with the periphery of one of said shelves with said post.

CHARLES DUMLER.